(12) United States Patent
Schiariti et al.

(10) Patent No.: US 11,280,296 B2
(45) Date of Patent: Mar. 22, 2022

(54) TEST METHOD FOR TESTING A SOLID-PROPELLANT ROCKET ENGINE, SOLID-PROPELLANT ROCKET ENGINE AND SYSTEM FOR IMPLEMENTING THE METHOD

(71) Applicant: AVIO S.P.A., Rome (IT)

(72) Inventors: Daniele Schiariti, Rome (IT); Paolo Bellomi, Rome (IT)

(73) Assignee: AVIO S.P.A., Rome (IT)

( * ) Notice: Subject to any disclaimer, the term of this patent is extended or adjusted under 35 U.S.C. 154(b) by 142 days.

(21) Appl. No.: 16/755,068

(22) PCT Filed: Oct. 11, 2018

(86) PCT No.: PCT/IB2018/057896
§ 371 (c)(1),
(2) Date: Apr. 9, 2020

(87) PCT Pub. No.: WO2019/073437
PCT Pub. Date: Apr. 18, 2019

(65) Prior Publication Data
US 2021/0190014 A1  Jun. 24, 2021

(30) Foreign Application Priority Data
Oct. 13, 2017 (IT) .................. 102017000115681

(51) Int. Cl.
*F02K 9/96* (2006.01)
*F02K 9/24* (2006.01)
(Continued)

(52) U.S. Cl.
CPC ............ *F02K 9/96* (2013.01); *F02K 9/24* (2013.01); *F02K 9/343* (2013.01); *F02K 9/36* (2013.01);
(Continued)

(58) Field of Classification Search
CPC .............. F02K 9/24; F02K 9/343; F02K 9/96
See application file for complete search history.

(56) References Cited

U.S. PATENT DOCUMENTS 4,149,404 A * 4/1979 White .................. G01N 3/12
73/37
4,711,086 A 12/1987 Offe et al.
(Continued)

FOREIGN PATENT DOCUMENTS

EP 0 226 499 A1 6/1987
FR 2 466 627 A1 4/1981

*Primary Examiner* — Todd E Manahan
*Assistant Examiner* — Kyle Robert Thomas
(74) *Attorney, Agent, or Firm* — McGlew and Tuttle, P.C.

(57) ABSTRACT

A solid-propellant rocket engine (1) has a casing (2) and a thermal protection (15) internally coating the casing and delimiting a housing (17), which contains a mass of solid propellant (3); the thermal protection has a fixed portion (22) and at least one movable portion (23) that adheres to the mass of solid propellant (3) and can be moved from a back position to a forward position with respect to the fixed portion (22) through a thrust system obtained by pressuring a chamber 31 provided by installing a membrane 32 between the fixed portion 22 and the movable portion 23; the engine is tested by verifying the adhesion of the mass of solid propellant (3) to the movable portion (23) after having moved the movable portion (23) to the forward position by means of a thrust directed from the fixed portion towards the mass of solid propellant (3).

20 Claims, 4 Drawing Sheets

(51) Int. Cl.
    *F02K 9/34* (2006.01)
    *F02K 9/36* (2006.01)
(52) U.S. Cl.
    CPC .... *F05D 2260/231* (2013.01); *F05D 2260/83* (2013.01); *F05D 2300/6111* (2013.01)

(56) References Cited

U.S. PATENT DOCUMENTS 4,803,038 A * 2/1989 Beboux ................... F02K 9/346
                                            102/291
5,289,723 A * 3/1994 Thompson ............... G01N 3/24
                                            73/842

* cited by examiner

TEST METHOD FOR TESTING A SOLID-PROPELLANT ROCKET ENGINE, SOLID-PROPELLANT ROCKET ENGINE AND SYSTEM FOR IMPLEMENTING THE METHOD

TECHNICAL FIELD

The present invention relates to a method for testing a solid-propellant rocket engine.

BACKGROUND TO THE INVENTION

Solid-propellant rocket engines typically comprise an outer casing of axially symmetrical shape, adapted to house a solid propellant charge, and an ignition system. The ignition system is arranged at one of the two axial ends of the casing and comprises a pyrotechnic composition, whose controlled detonation starts the combustion of the solid propellant. An end nozzle is coupled to the end opposite to the pyrotechnic charge, for discharging the combustion gases.

The casing is internally coated with a thermal protection made of an ablative material, typically comprising elastomers, to protect the casing material against high temperatures. Inside the casing the solid propellant must perfectly adhere to the thermal protection, so that combustion proceeds as smoothly as possible, without sudden pressure increases. In some cases, a thin layer of adhesive material, commonly called "liner", is interposed between the solid propellant and the thermal protection in order to improve adhesion.

Typically, when the casing is loaded with the propellant, the latter is still in the liquid state and only after hot cross-linking (commonly called "curing") and subsequent cooling, the charge solidifies, thus adhering to the thermal protection. The propellant tends to shrink while solidifying, but, as it adheres to the thermal protection, it is subject to tensile stresses. There is therefore the risk of cracks forming in the propellant or of localized areas of the engine where the propellant detaches from thermal protection. To reduce this risk, the thermal protection usually has a flexible annular appendix, commonly known as "stress relief flap", between the propellant and the end of the casing. During curing, this appendix tends to follow the shrinkage of the propellant, thus remaining adhering thereto. This greatly reduces the tension on the solid propellant.

Usually, after curing, the adhesion between the thermal protection and the solid propellant, as well as the absence of cracks in the propellant near the areas of maximum tension, are checked by generating a stress condition similar to that occurring under operating conditions. In particular, the engine is positioned vertically, more precisely in an "anti-flight" configuration, i.e. with the end on which the nozzle will be placed arranged upwards. In this configuration, the weight of the propellant charge causes the thermal protection provided at that end to be put under traction. During this tensile stress action, the protection is checked through radiographic examinations for verifying the absence of defects. Then, to check the opposite end, it is necessary to overturn the casing so as to have a similar tensile stress state, thanks to the weight of the propellant. Although this method is widely used, there is a need of improving it so as to alleviate or to eliminate the overturning operations. In fact, as it is clearly apparent, overturning a heavy element of several tons is a particularly slow operation, risky in terms of safety. Moreover, complex, bulky and expensive equipment is necessary for overturning the casing.

The object of the present invention is to provide a test method for testing a solid-propellant rocket engine, which allows to fulfill the above mentioned requirement in a simple and economical manner.

SUMMARY OF THE INVENTION

According to the present invention, a test method is provided for testing a solid-propellant rocket engine, as claimed in claim 1.

The present invention also relates to a solid-propellant rocket engine. According to the present invention, a solid-propellant rocket engine is provided, as claimed in claim 8.

BRIEF DESCRIPTION OF THE DRAWINGS

The invention will be described below with reference to the accompanying drawings, which illustrate a non-limiting exemplary embodiment. In the drawing.

DETAILED DESCRIPTION

Figure 1:
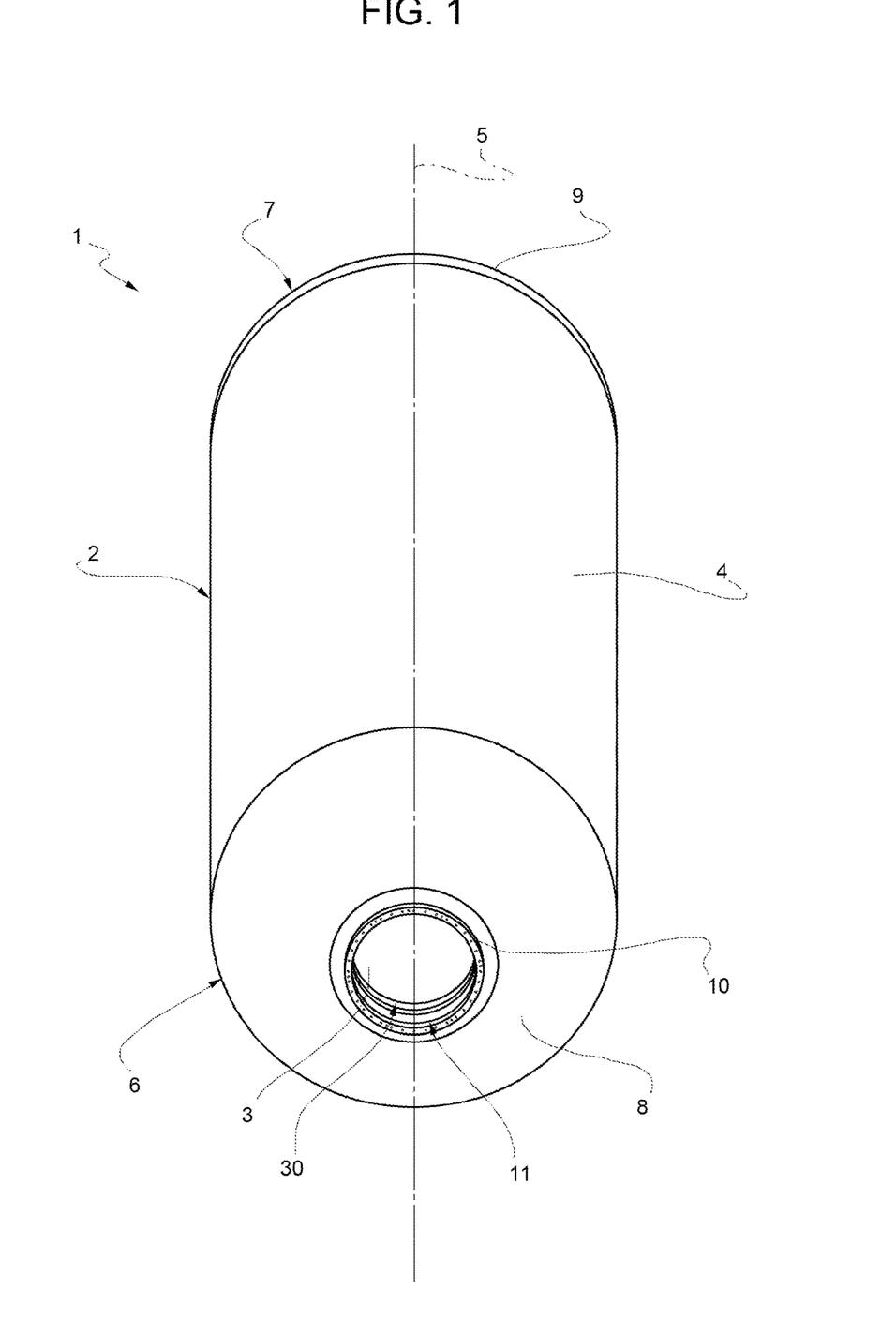
FIG. 1 is a partial perspective view of a solid-propellant rocket engine for carrying out the test method according to a preferred embodiment of the present invention.

In FIG. 1, reference number 1 indicates, as a whole, a solid-propellant propellant rocket engine (partially illustrated) comprising a casing 2, which houses a solid propellant mass 3. The casing 2 comprises a preferably cylindrical intermediate portion 4, with a symmetry axis 5, and two annular end portions 6 and 7, which are mutually opposite along the axis 5. In particular, the portions 6 and 7 comprise respective domes 8, 9 connected to the portion 4, and respective fixed end collars projecting axially outwardly with respect to the corresponding domes 8, 9. In FIG. 1, only the collar of the portion 6 is shown, indicated by reference number 10.

Preferably, the unit comprised of the portion 4 and the domes 8, 9 is made of steel. Alternatively, it is made of composite material, including for example carbon fibers or Kevlar fibers. The end collars are commonly referred to in English as "polar bosses" and are generally made of steel.

The portion 6 has an axial opening 11 of such dimensions as to allow inserting, in the casing 2, an ignition device (not shown), which is coupled, in a known and not shown manner, to the polar boss 10 and whose function, in use, is to start the combustion of the solid propellant 3.

Also the portion 7 has an axial opening (not shown in the attached figures) to flow, in use, combustion products towards a discharge end nozzle (not shown) that can be coupled in a known manner to the polar boss of portion 7.

Figure 2:
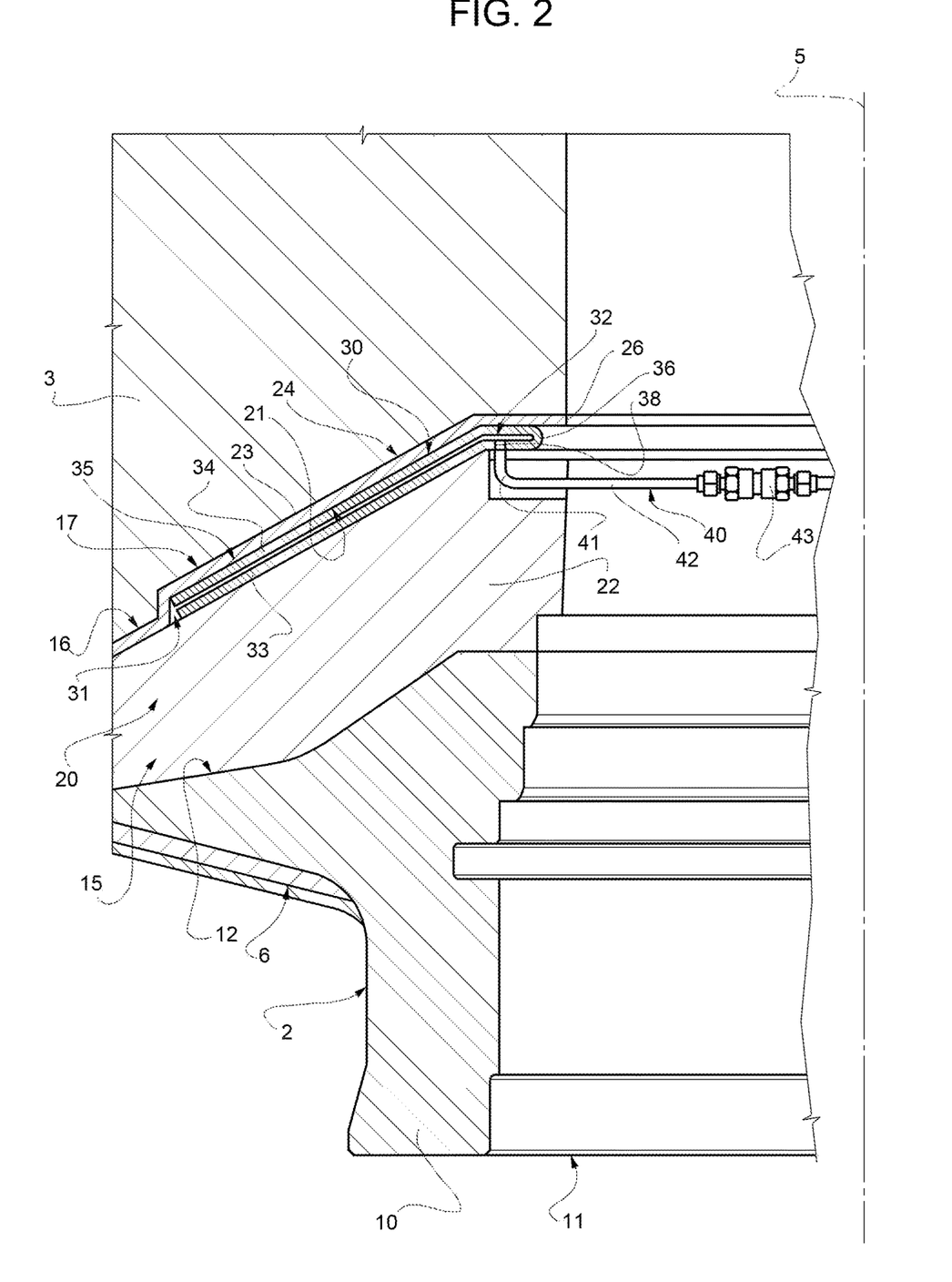
FIG. 2 is a section according to a diameter section plane, which shows an enlarged detail of the solid-propellant rocket engine of FIG. 1.

As shown in FIG. 2, the casing 2 has an inner surface 12, which is coated with a thermal protection 15, formed by a layer of ablative material having such characteristics as to protect the material of the casing 2 against high temperatures and mechanical stresses during combustion of the mass of solid propellant 3. The material of the thermal protection 15 is of known type, comprising for example elastomer material with additives, where reinforcing fibers are embedded. The thermal protection 15 has an adhesion surface 16 defining a housing 17, which houses the mass of solid propellant 3. The mass of propellant 3 adheres to the adhesion surface 16, directly or through the interposition of a thin layer of adhesive and ablative polymeric material, commonly called "liner".

Figure 3:
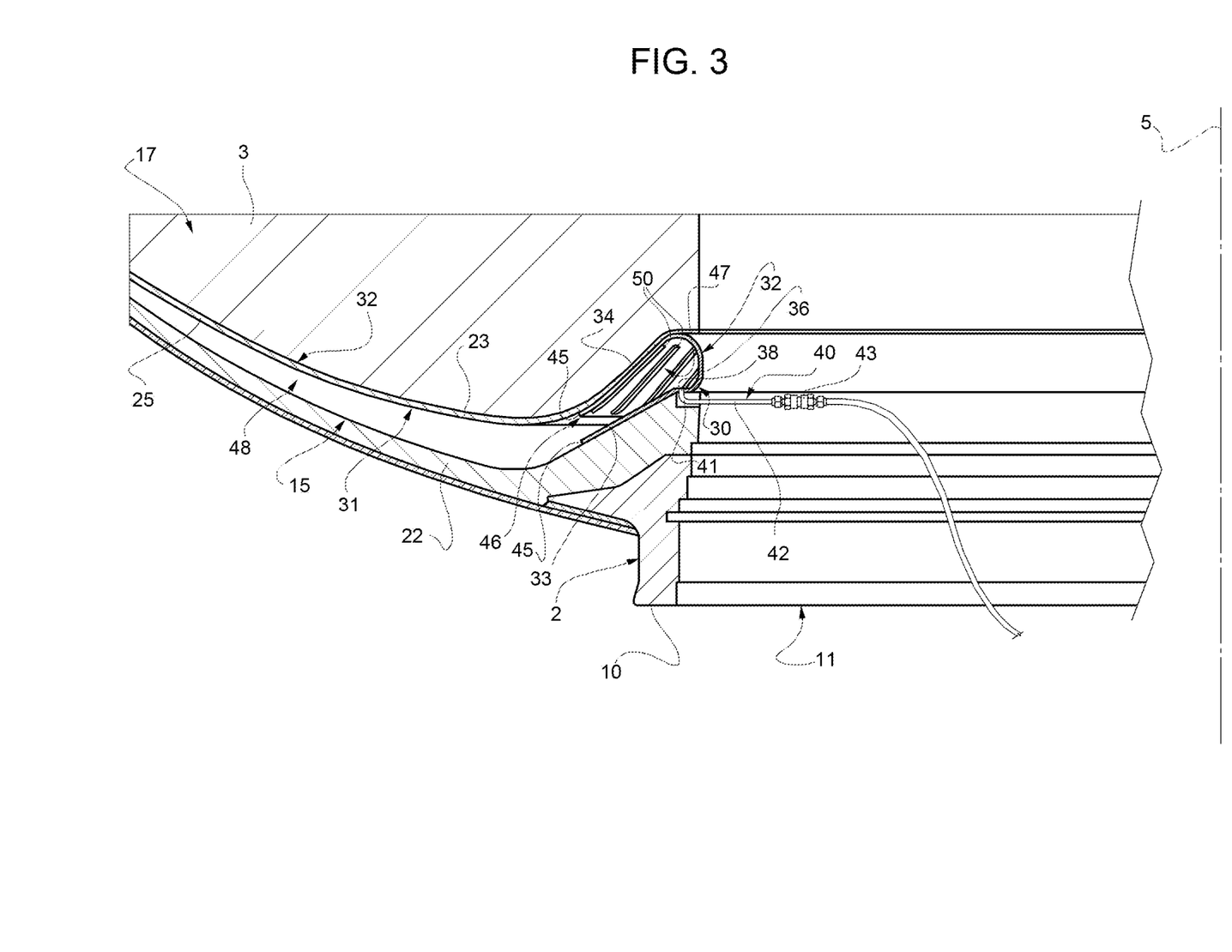
FIG. 3 is similar to FIG. 2 and shows a step of the test method of the present invention.

The portion of the thermal protection 15 covering the surface 12 in correspondence of the portion 6 is indicated by the reference number 20 in FIG. 2. The portion 20 extends in ring fashion around the opening 11, and comprises: a base portion 22, which is fixed and covers the surface 12 in correspondence of the portion 6; and at least a flap 23, usually referred to as "stress relief flap", having a face 21 facing towards the base portion 22 and a face 24 defining a part of the adhesion surface 16. The flap 23 ends radially outwardly with an end portion 25 (FIG. 3) joined to the base portion 22 in such a manner (not shown) as to define a virtual hinge, and radially inwardly with an edge 26 that is free to move. The flap 23 is therefore flexible around the virtual hinge defined by the end portion 25 so as to move axially towards, and away from, the base portion 22. In other words, the flap 23 is movable between a back position, quite close to the base portion 22 (FIG. 2), and a forward position, where it is quite distant from the base portion 22 (FIG. 3).

Preferably, the portion 20 comprises a single annular flap 23. Therefore, also the edge 26 is annular, and is coaxial with the opening 11.

According to a preferred aspect of the present invention, the motor 1 comprises a thrust device 30, at least part of which is arranged between the base portion 22 and the flap 23. The thrust device 30 is so configured as to exert on the flap 23 a thrust action from the base portion 22 towards the face 21 and the mass of solid propellant 3, so as to move the flap 23 towards the forward position, during a test method that will be described below.

In the illustrated preferred embodiment, the thrust device 30 comprises an expansible chamber 31, insulated from the housing 17 and adapted to communicate with a source of pressurized fluid, for example air. The thrust device 30 is so configured as to allow the pressurization of the chamber 31, generated by closing the volume between the thermal protection portion 22 and the surface of the flap 23, exploiting the surface of the mounted flap 23 to allow the thermal shrinkage of the propellant. The thrust device 30 is then configured to generate a thrust action by pressurizing the circumscribed volume 31.

Figure 4:
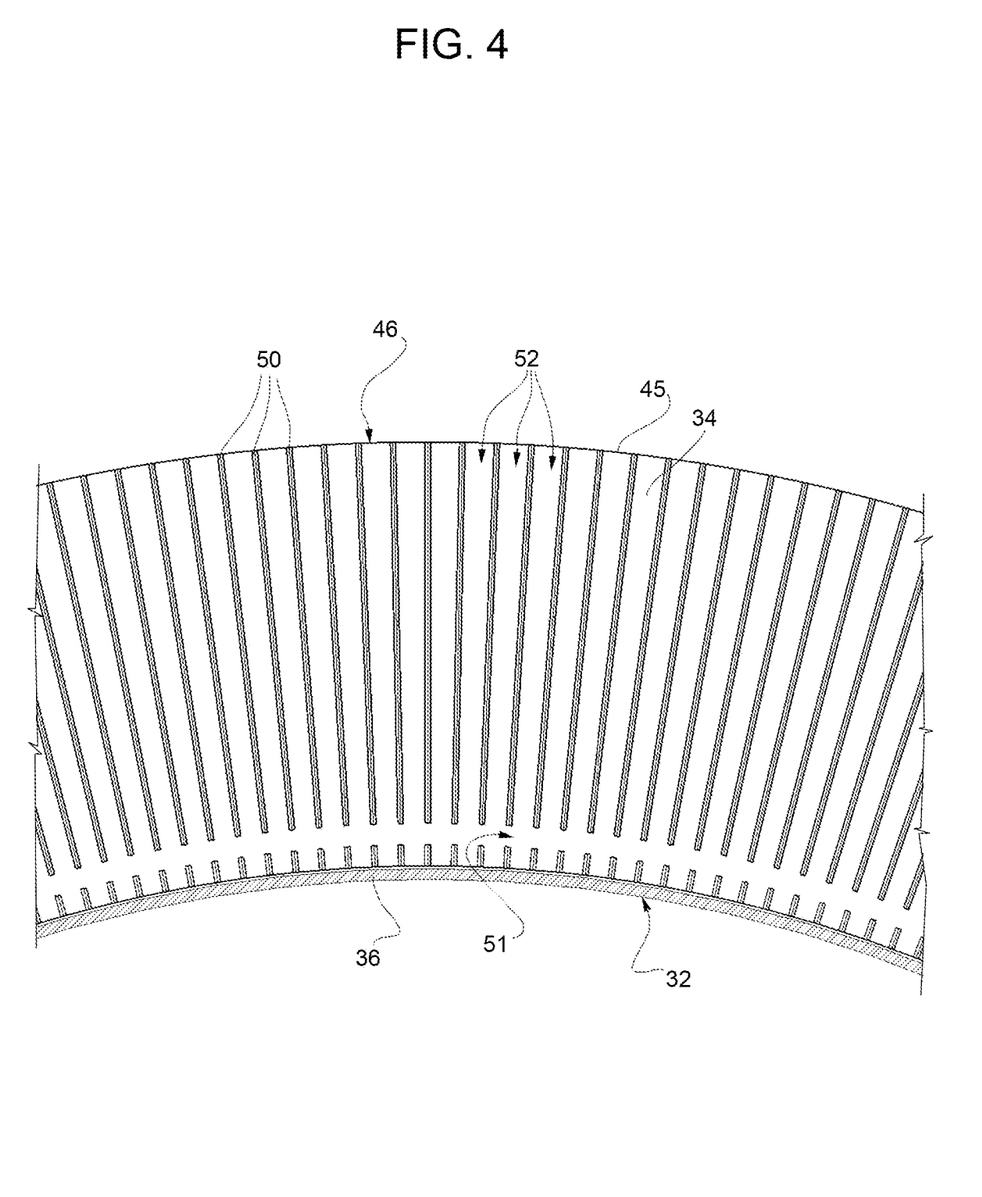
FIG. 4 is a front view, in enlarged scale and with some parts removed for the sake of clarity, of a component visible in FIGS. 2 and 3.

Advantageously, the thrusting device 30 comprises a flexible membrane 32 coupled to the base portion 22 and to the flap 23 and defines the chamber 31. The flexible membrane 32 seals the chamber 31, so that it can be pressurized. As shown in FIGS. 3 and 4, the membrane 32 is defined by an annular body coaxial with the opening 11. In particular, the membrane 32 comprises a flap 33 fixed to the base portion 22 and a flap 34 fixed to the flap 23 and arranged on the face 21.

The membrane 32 further comprises a deformable portion 36, intermediate between the flaps 33 and 34. The portion 36 has a U-shaped cross-section. The portion 36 can be stretched or elongated when the chamber 31 is pressurized and the flap 23 axially moves away from the base portion 22.

Suitably, the material of the membrane 32 is a composite material comprising a matrix defined by EPDM (Ethylene-Propylene Diene Monomer) rubber so as to be chemically compatible with the material of the thermal protection 15. It is however possible to use alternative materials, without affecting the function of the thrust device 30.

The membrane 32 has one or more inlets 38, only one of which shown in FIGS. 2 and 3, to introduce the operating fluid into the chamber 31. The inlets 38 are provided for example in an area between the flap 33 and the portion 36. Preferably, the inlets 38 are more than one and angularly spaced from one another around the axis 5, so as to allow a uniform distribution of the operating fluid within the chamber 31.

The thrust device 30 further comprises a plurality of supply ducts 40 (advantageously one for each inlet 38), each of which has: a connection 41, fixed to the membrane 32 in correspondence of a respective inlet 38; an intermediate tube 42; a connector 43, particularly of the fast-coupling type, connected to the connection 41 through the tube 42 and adapted to be connected to the pressurized fluid source; a check valve (not shown) configured to open only when the connector 43 receives pressurized fluid. In particular, the check valve can be integrated in the connector 43.

As shown in FIG. 3, the flaps 33, 34 have respective margins 45 defining a slit 46 therebetween, which preferably extends continuously over the entire length of the margins 45 in circumferential direction. The slit 46 connects two regions 47, 48 of the chamber 31, the region 47 being defined by the membrane 32, in a radially more internal position, the region 48 being defined by the portion 25 of the flap 23 and the base portion 22, in a radially more external position.

Conveniently, as shown in FIG. 4, in some embodiments the membrane 32 comprises a plurality of projections 50 for keeping the flap 33 spaced from the flap 34 when the flap 23 is in back position, and thus facilitating entrance and flow of the pressurized fluid in the membrane 32. In the specific example, the projections 50 project from the flap 34 towards the flap 33. In particular, in the illustrated embodiment the projections 50 define, in the chamber 31, a circumferential channel 51 and a plurality of radial channels 52 connected with the circumferential channel 51. The inlets 38 lead directly to the circumferential channel 51 that has therefore the function of collector for the radial channels 52, which in turn lead to the slit 46. The projections 50 have therefore the function of preventing the inlets 38 from closing when the flap 23 is retracted.

During the production process of the engine 1, the membrane 32 is arranged between the base portion 22 and the flap 23 before loading the solid propellant mass 3 into the housing 17.

In greater detail, firstly the flap 33 is fixed, for example by gluing, to the base portion 22. Then, the flap 23 is put over, and fixed, for example by gluing, to the flap 34. Thanks to this fixing, the portion 36 of the membrane 32 radially closes the chamber 31 inwardly, in particular towards the empty volume left by extracting the plug from the mass of cross-linked solid propellant 3. The chamber 31 is thus sealed.

During these fixing steps, the connectors 43 are not connected to the pressurized fluid source. In this way, the position of the flap 23 depends on the pressure in the chamber 31, preferably equal to about the atmospheric pressure.

After having fixed the membrane 32, the housing 17 is filled with liquid propellant, according to modes that are generally known. For example, filling can be done by axially introducing a plug (not shown) in the casing 2. The plug has such dimensions as to pass through the whole casing 2 closing the opening 11 and the axial opening provided through the end portion 7. In this way, the plug seals the housing 17 against the external environment.

During filling, the liquid propellant comes into contact with the thermal protection 15.

After filling, the liquid propellant is subjected to a cross-linking or curing step, for example by heating in a furnace, thus becoming solid. As mentioned above, during solidification the mass of solid propellant 3 is obtained, which adheres to the thermal protection 15, and therefore also to the flap 23. The plug is then removed, after the solid propellant 3 has cooled. In this way, in the central area of the engine 1 an empty volume remains, which corresponds to the volume previously occupied by the plug.

At this point, before mounting the ignition device and the exhaust nozzle, the engine 1 is subjected to a testing procedure, to check the adhesion of the mass of solid propellant 3 to the thermal protection 15 and/or to check any defects that could have been generated by the shrinkage of the propellant charge during solidification.

To carry out the procedure, the engine 1 is preferably arranged in an anti-flight configuration, for safety reasons. In this position, the axis 5 is vertical and the end portion 6 is placed at the bottom, while the end portion 7 is placed at the top. With the engine 1 in this position, the flap 23 is automatically arranged in the back position due to the weight of the solid propellant 3, as there is no pressure in the chamber 31. This weight applies a tensile stress downward on the thermal protection 15 in correspondence of the end portion 7. Under these conditions, the adhesion between the thermal protection 15 and the mass of solid propellant 3 in correspondence of the end portion 7 can be checked in the conventional way.

Then, without overturning the engine 1 and keeping it always in anti-flight configuration, the end portion 6 is checked.

More in detail, the connectors 43 are connected to the source of pressurized fluid (for example compressed air, as mentioned above). Flowing through the inlets 38 and inside the channels 51 and 52, the fluid fills the chamber 31, which is pressurized and thus expands. This expansion causes an upwardly oriented axial thrust, acting on the face 21 of the flap 23. When this thrust becomes greater than the weight of the mass of solid propellant 3, it moves the flap 23 to the forward position, raising the mass of solid propellant 3. This raising causes a state of tension in the thermal protection 15 and at the adhesion surface 16.

At this point, preferably, the connectors 43 are released from the fluid source. As mentioned above, thanks to the check valves, there are no significant pressure drop inside the chamber 31 and therefore back movements of the flap 23 towards the base portion 22.

The procedure continues with a checking step, performed by means of suitable remote sensing instruments, for example radiographic instrumentation, in order to identify any adhesion defects and/or defects in the mass of solid propellant 3.

At the end of the checking step, the check valves are opened to allow the pressurized fluid to exit from the chamber 31, thus allowing the flap 23 to move back towards the base portion 22. When the pressure in the chamber 31 is approximately equal to atmospheric pressure, the portion 36 is preferably cut to put the chamber 31 in communication with the external environment. In this way, a final configuration of the solid-propellant engine is obtained that, when the engine is on, allows the combustion gases to penetrate the space provided between the flap 23 and the base portion 22 of the coating. In this way, after the test procedure, the solid-propellant rocket engine, once started, operates like a traditional engine.

In view of the above description it is clearly evident that the inventive method is much simpler, faster and more economical than the one in which the engine 1 shall be overturned to test the end portion 6.

In fact, the step of checking the adhesion of the mass of solid propellant 3 to the flap 23 can be carried out independently of the orientation of the casing 2, without the need of displacing it. In particular, it is not necessary to overturn the engine 1 to bring the end portion 6 upwards and to use the weight of the propellant mass to bias the flap 23. Therefore, it is no longer necessary to use dedicated spaces and machines in order to overturn or, more generally, to move the casing 2 during testing operations. This entails a significant saving in costs and times for these operations. Furthermore, the test is carried out under optimal safety conditions, as the engine 1 remains in an anti-flight condition during the test of both the portions 6 and 7, and in any case, the potentially dangerous step of overturning the engine is eliminated.

The use of a pressurized fluid to obtain the axial thrust on the mass of solid propellant 3 is particularly simple, compared, for example, to the use of actuators.

Moreover, as shown in FIG. 2, the thrust device 30 is of negligible size, especially in axial direction, and it is relatively light, so as not to modify the normal operating conditions of the engine 1. Moreover, the membrane 32 can be easily cut in order to allow the combustion gases to enter the chamber 31 during the normal operating conditions of the engine 1.

The great surface of the chamber 31 allows high thrusts to be achieved, with relatively low fluid pressures.

As already indicated above, the projections 50 ensure that the fluid enters the chamber 31 even when the flap 23 is retracted towards the base portion 22. In particular, the channels 52 facilitate the flow towards the region 48 of the chamber 31.

Finally, the check valves, which can be advantageously integrated in the connectors 43, prevent polluting agents from entering into the chamber 31 before the test procedure.

Finally, from the above description it is clearly apparent that modifications and variants can be done to the test method and to the engine 1 described above with reference to the attached figures, without however departing from the protective scope of the invention as defined in the appended claims.

In particular, the test method could be performed while the axis 5 of the engine 1 is directed differently than in the vertical direction, or the end portion 7 could be arranged downwards to be tested in a manner similar to that described above for the end portion 6.

Furthermore, the membrane 32 could have a different shape from that described above, for example a closed cross-section, or it could be replaced by a plurality of inflatable elements or chambers, distinct and spaced from one another along the perimeter of the opening 11.

Lastly, the pressurization of the chamber 31 could take place by means of a fluid other than air.

The invention claimed is:

1. A test method for testing a solid-propellant rocket engine comprising a mass of solid propellant, a casing extending along an axis and said casing comprising two annular end portions opposite to each other along said axis and a heat protection arranged to coat an inner surface of said casing and said heat protection delimiting a housing containing said mass of solid propellant, said heat protection including a coating portion comprising a fixed portion and at least one movable portion, said fixed portion coating at least one of said two annular end portions, said at least one movable portion having a face that adheres to said mass of solid propellant and said at least one movable portion is movable between a back position and a forward position, said at least one movable portion being closer to said fixed portion in said back position and said at least one movable portion being more distant from said fixed portion in said forward position, the method comprising the steps of:

moving said at least one movable portion to said forward position by exerting, on said at least one movable portion, a thrust oriented from said fixed portion towards said mass of solid propellant;

checking adhesion of said mass of solid propellant to said at least one movable portion and/or any defects after moving said at least one movable portion to said forward position.

2. The method of claim 1, wherein said thrust is generated by a thrust device.

3. The method of claim 2, wherein said thrust device is positioned between said fixed portion and said at least one movable portion of said coating portion.

4. The method of claim 1, wherein said at least one movable portion has another face opposite to said face and facing towards said fixed portion, said thrust being exerted on said another face.

5. The method of claim 4, wherein said thrust is exerted by supplying a pressurized working fluid between said fixed portion and said another face.

6. The method of claim 5, wherein said pressurized working fluid is supplied in at least one pressurizable and expansible chamber, said at least one pressurizable and expansible chamber being provided between said fixed portion and said at least one movable portion.

7. The method of claim 6, wherein at least part of said at least one pressurizable and expansible chamber is delimited by a flexible membrane.

8. The method of claim 7, wherein said flexible membrane is cut after checking said adhesion of said mass of solid propellant to said at least one movable portion and/or any defects so as to make said at least one pressurizable and expansible chamber communicate with an outer environment and with a cavity inside said mass of solid propellant.

9. The method of claim 1, wherein said axis is vertical, and said thrust is directed from a bottom upwards.

10. A solid-propellant rocket engine comprising a casing extending along an axis and said casing having two annular end portions opposite to each other along said axis, wherein a heat protection is arranged to coat an inner surface of said casing and said heat protection delimits a housing configured so as to contain a mass of solid propellant, said heat protection including a coating portion comprising a fixed portion and at least one movable portion, said fixed portion coating at least one of said two annular end portions, said at least one movable portion having a face that defines an area of said housing and said face is adapted to adhere to said mass of solid propellant and said at least one movable portion is movable between a back position and a forward position, said at least one movable portion being closer to said fixed portion in said back position and said at least one movable portion being more distant from said fixed portion in said forward position, the solid-propellant rocket engine comprising:

a thrust device, configured to exert, on said at least one movable portion, in a test phase before an ignition device is installed, a thrust directed from said fixed portion towards said housing and to move said at least one movable portion to said forward position.

11. The solid-propellant rocket engine of claim 10, wherein at least a part of said thrust device is arranged between said at least one movable portion and said fixed portion of said coating portion of said heat protection.

12. The solid-propellant rocket engine of claim 11, wherein said thrust device comprises at least a pressurizable and expansible chamber, between said fixed portion and said at least one movable portion.

13. The solid-propellant rocket engine of claim 12, wherein said thrust device comprises a flexible membrane, which delimits, at least partially, said pressurizable and expansible chamber and said flexible membrane has at least one inlet to receive a pressurized fluid.

14. The solid-propellant rocket engine of claim 13, wherein said flexible membrane is fixed to said at least one movable portion and said fixed portion.

15. The solid-propellant rocket engine of claim 13, wherein said flexible membrane has a plurality of projections inside said pressurizable and expansible chamber.

16. The solid-propellant rocket engine of claim 15, wherein said plurality of projections define, in said pressurizable and expansible chamber, at least a circumferential channel and a plurality of radial channels connected to said circumferential channel.

17. The solid-propellant rocket engine of claim 12, wherein said pressurizable and expansible chamber comprises at least one supply duct with a connection for connecting said pressurizable and expansible chamber to a source of said pressurized fluid.

18. The solid-propellant rocket engine of claim 12, wherein said pressurizable and expansible chamber comprises at least one connector, configured for connecting to a source of pressurized fluid outside said solid-propellant rocket engine.

19. The solid-propellant rocket engine of claim 12, wherein said connector comprises a check valve.

20. A system comprising:

a solid-propellant rocket engine comprising a casing extending along an axis and said casing having two annular end portions opposite to each other along said axis, wherein a heat protection is arranged to coat an inner surface of said casing and said heat protection delimits a housing configured to contain a mass of solid propellant, said heat protection including a coating portion, said coating portion comprising a fixed portion and at least one movable portion, said fixed portion coating at least one of said two annular end portions, said at least one movable portion having a face defining an area of said housing and said face being configured to adhere to said mass of solid propellant and said at least one movable portion being movable between a back position and a forward position, said at least one movable portion being closer to said fixed portion in said back position and said at least one movable portion being more distant from said fixed portion in said forward position, said solid-propellant rocket engine further comprising a thrust device, configured so as to exert, on said movable portion, in a test phase before an ignition device is installed, a thrust directed from said fixed portion towards said housing and to move said at least one movable portion to said forward position; and a source of pressurized fluid configured to be connected to said thrust device of said solid-propellant rocket engine.

\* \* \* \* \*